(12) United States Patent
Sun et al.

(10) Patent No.: US 11,397,244 B2
(45) Date of Patent: Jul. 26, 2022

(54) ELECTRONIC DEVICE

(71) Applicant: BEIJING XIAOMI MOBILE SOFTWARE CO., LTD., Beijing (CN)

(72) Inventors: Changyu Sun, Beijing (CN); Yanteng Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 381 days.

(21) Appl. No.: 16/738,628

(22) Filed: Jan. 9, 2020

(65) Prior Publication Data

US 2021/0072357 A1    Mar. 11, 2021

(30) Foreign Application Priority Data

Sep. 9, 2019    (CN) .......................... 201910864690.8

(51) Int. Cl.
G01S 7/481 (2006.01)

(52) U.S. Cl.
CPC .................. G01S 7/4815 (2013.01)

(58) Field of Classification Search
CPC ...... G01S 7/4815; G06F 3/147; G06F 1/1637; G09G 3/3208; G09G 2320/0209; G09G 3/20; H04M 1/0266; H04M 1/02
See application file for complete search history.

(56) References Cited

U.S. PATENT DOCUMENTS

| 2012/0050189 | A1  | 3/2012  | Choboter et al. |
| 2016/0315290 | A1* | 10/2016 | Zhang ................. H01L 51/5275 |
| 2019/0377400 | A1  | 12/2019 | Zhang |

FOREIGN PATENT DOCUMENTS

| CN | 107948419 A | 4/2018 |
| CN | 108540595 A | 9/2018 |
| CN | 109040417 A | 12/2018 |
| CN | 109656317 A | 4/2019 |
| CN | 109828636 A | 5/2019 |
| CN | 208861265 U | 5/2019 |

OTHER PUBLICATIONS

Extended European Search Report dated Jul. 27, 2020 in European Application No. 20152135.8, citing documents AA, AB, and AO therein, 6 pages.
Extended European Search Report dated Jul. 27, 2020 in European Patent Application No. 20152135.8, 6 pages.

\* cited by examiner

*Primary Examiner* — Thanh Y. Tran
(74) *Attorney, Agent, or Firm* — Oblon, McClelland, Maier & Neustadt, L.L.P.

(57) ABSTRACT

An electronic device including a screen module and a distance sensing module. The screen module includes a light emitting unit and a control circuit conductively connected with the light emitting unit, where when energy received by a photoelectric effect unit of the control circuit is greater than an excitation threshold of the photoelectric effect unit the control circuit is turned on and the light emitting unit emits light. The distance sensing module is arranged below a display area of the screen module and includes an infrared receiver and a plurality of infrared emitters, where emitted energy of any one of the plurality of infrared emitters is less than the excitation threshold and a sum of emitted energies of the plurality of infrared emitters is greater than an operating threshold of the distance sensing module.

15 Claims, 5 Drawing Sheets

ELECTRONIC DEVICE

CROSS-REFERENCE TO RELATED APPLICATION

The present application is based upon and claims priority to Chinese Patent Application No. 201910864690.8, filed on Sep. 9, 2019, the disclosure of which is hereby incorporated by reference in its entirety.

BACKGROUND

Electronic devices like a mobile phone generally include a front distance sensing module assembled on a front side of the electronic device and other functional components, for realizing a corresponding sensing function.

SUMMARY

The present disclosure relates to the field of electronic technologies, and more particularly, to an electronic device.

According to embodiments of the present disclosure, an electronic device is provided, which can include a screen module and a distance sensing module. The screen module can have a light emitting unit and a control circuit conductively connected with the light emitting unit. When energy received by a photoelectric effect unit of the control circuit is greater than an excitation threshold, the control circuit can be turned on, and the light emitting unit emits light.

The distance sensing module is arranged below a display area of the screen module, and includes an infrared receiver and multiple infrared emitters. Emitted energy of any one of the multiple infrared emitters is less than the excitation threshold of the photoelectric effect unit, while a sum of the emitted energies of the multiple infrared emitters is greater than an operating threshold of the distance sensing module.

It is to be understood that the above general descriptions and detailed descriptions below are only exemplary and explanatory, and not intended to limit the present disclosure.

BRIEF DESCRIPTION OF THE DRAWINGS

The accompanying drawings, which are incorporated in and constitute a part of the description, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Electronic devices like a mobile phone generally include a front distance sensing module assembled on the front side of the electronic device and other functional components, for realizing a corresponding sensing function. However, with increasing requirements for screen display from users, if the front distance sensing module is arranged on a non-display area of the front side, the area of the non-display area is increased, and a screen display ratio is reduced. If the front distance sensing module is arranged below a display area, the infrared ray for sensing a distance will interfere with a display effect of the screen.

Figure 1:
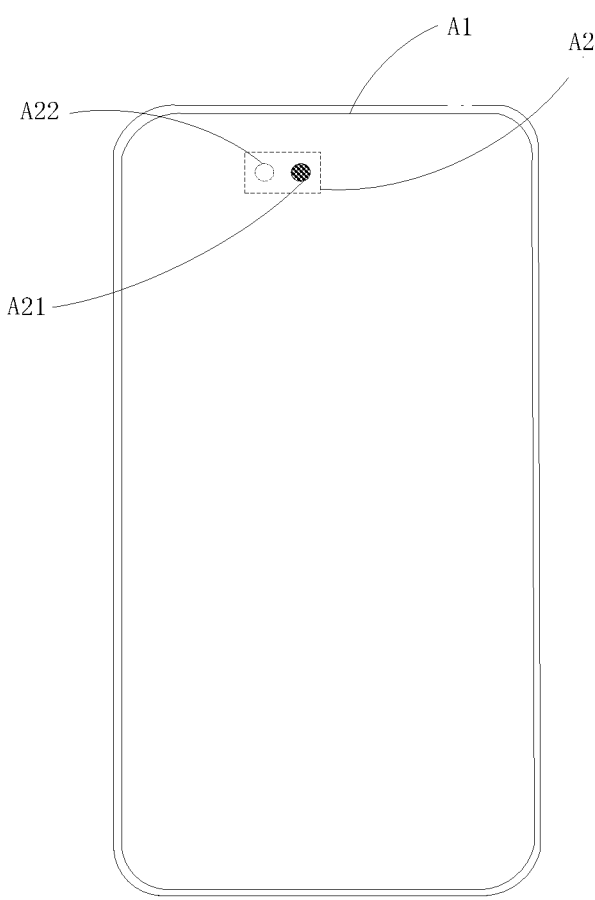
FIG. 1 is a structure diagram of an electronic device.

As illustrated in FIG. 1, the display principle of an Active-Matrix Organic Light-Emitting Diode (AMOLED) screen A1 is controlling, through a Metal Oxide Semiconductor (MOS) tube, a Light Emitting Diode to conduct to emit light. An infrared distance sensor A2 may include an infrared emitter A21 and an infrared receiver A22. When infrared light emitted by the infrared distance sensor A2 below the display area of the screen A1 through the infrared emitter A21 penetrates through the screen A1, a photoelectric effect generates, which makes the MOS tube in the screen A1 in an uncontrolled on-state. Finally, a light spot is formed on the display area of the screen A1 after the LED emits light.

Figure 2:
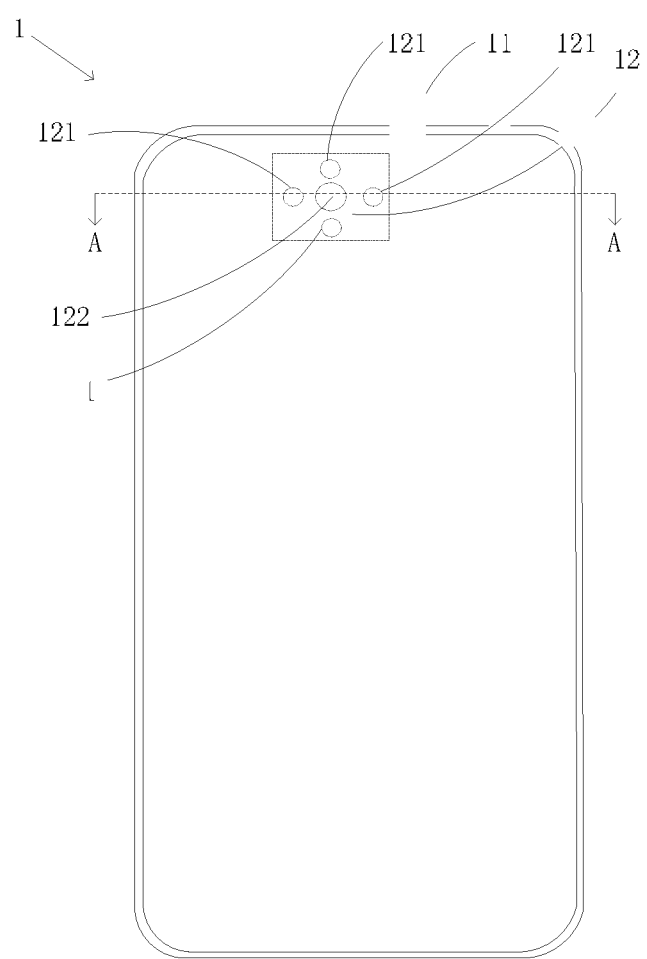
FIG. 2 is a structure diagram of an electronic device according to some exemplary embodiments.
Figure 3:
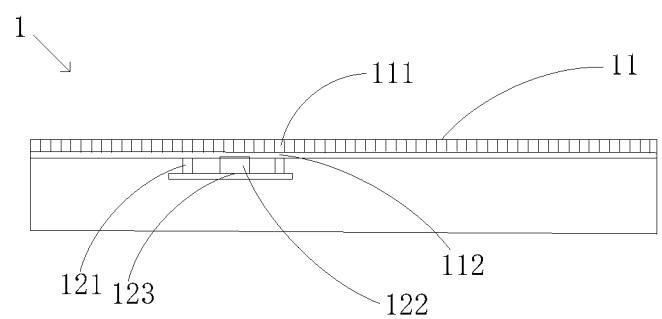
FIG. 3 is a structure diagram of A-A cross section in the embodiments illustrated in FIG. 2.

FIG. 2 is a structure diagram of an electronic device according to some exemplary embodiments. FIG. 3 is a structure diagram of A-A cross section in the embodiments illustrated in FIG. 2. As illustrated in FIG. 2 and FIG. 3, the electronic device 1 may include a screen module 11 and a distance sensing module 12. The screen module 11 can further include a light emitting unit 111 and a control circuit 112 conductively connected with the light emitting unit 111. When received energy of a photoelectric effect unit (unlabeled) of the control circuit 112 is greater than an excitation threshold of the photoelectric effect unit, the control circuit 112 is turned on, and the light emitting unit 111 emits light. The distance sensing module 12 is arranged below the display area of the screen module 11, and includes an infrared receiver 122 and multiple infrared emitters 121. Emitted energy of any one of the multiple infrared emitters 121 is less than the excitation threshold of the photoelectric effect unit, and the sum of the emitted energies of the multiple infrared emitters 121 is greater than an operating threshold of the distance sensing module 12.

By arranging the distance sensing module 12 below the display area of the screen module 11, the occupation of a non-display area is reduced, and a display ratio of the screen module 11 is increased. The infrared receiver 122 and multiple infrared emitters 121 are arranged for the distance sensing module 12, so that emitted energy of each of the multiple infrared emitters 121 is less than the excitation threshold of the photoelectric effect unit of the screen module 11, and the light emitting unit 111 at a corresponding position of the screen is prevented, by means of multi-point emission, from emitting light due to the interference of the emitted energy of the infrared emitter 121. In addition, the sum of the emitted energies of the multiple infrared emitters 121 is greater than the operating threshold of the distance sensing module, so that the distance sensing module 12 can realize a distance sensing function by means of a collaboration of multiple infrared emitters 121. The above structure setting increases the display ratio of the screen module 11 while preventing the distance sensing module 12 from interfering with the display effect of the screen module 11.

It is to be noted that the photoelectric effect unit can sense the energy of ambient light, each photoelectric effect unit has one excitation threshold, and when the received energy of the photoelectric effect unit is greater than its excitation threshold, the control circuit 112 is turned on, and then the light emitting unit 111 emits light.

When the screen module 11 is in an operating state, a main board controls the corresponding light emitting unit 111 at each position of the display area to emit light to form the preset display effect, thereby realizing a display function of the screen module 11. When the screen module 11 is in a non-operating state, the main board controls the corresponding control circuit 112 at each position of the display area to be turned off, and the light emitting unit 111 is disabled to achieve a screen-off effect.

Taking the infrared light emitted by the infrared emitter 121 of the distance sensing module 12 for example, no matter whether the screen module 11 is in the operating state or the non-operating state, when the distance sensing module 12 operates, the multiple infrared emitters 121 arranged below the screen module 11 emit infrared lights from corresponding positions of the screen module 11 respectively, and only if the energy of the infrared light emitted from a corresponding position is less than the excitation threshold of the photoelectric effect unit, the light emitting unit 111 at the position is prevented from emitting light to generate the light spot, thereby preventing the impact on the display or screen-off effect of the screen module 11 after the light emitting unit 111 is enabled. Because the sum of the emitted energies of multiple infrared emitters 121 is greater than the operating threshold of the distance sensing module 12, the distance sensing module 12 can operation normally, and realize the distance sensing function by emitting the infrared lights through the multiple infrared emitters 121 and receiving the infrared light through the infrared receiver 122.

In the above embodiments, the distance sensing module 12 may further include a sensing body 123. Both the infrared receiver 122 and the infrared emitter 121 are integrated on the sensing body 123. The sensing body 123 can control the infrared emitter 121 to emit the infrared light with preset energy, and can analyze and calculate the infrared light received by the infrared receiver 122 to obtain a sensing distance. The above structure setting improves the integrability of the distance sensing module 12, which can not only facilitate the realization of a sensing function, but also reduce space occupation of the distance sensing module 12.

By arranging multiple infrared emitters 121 for the distance sensing module 12, where the multiple infrared emitters 121 may be arranged below different positions of the display area, the energies of the infrared emitters 121 dispersedly emit from the different positions of the display area of the screen module 11, thereby realizing a use effect of multi-point emission of the infrared emitter 121, and preventing the energy of a single infrared emitter 121 from concentrating on a position of the display area of the screen module 11 to form the light spot. The way of setting the infrared receiver 122 and the infrared emitter 121 is exemplarily illustrated below.

In some embodiments, the infrared receiver 122 and the infrared emitters 121 are arranged in an array, and the infrared receiver 122 is arranged adjacent to any one of the infrared emitters 121. By means of the infrared receiver 122 and the infrared emitters 121 arranged in the array, regularity and compactness of the integral structure of the distance sensing module 12 is improved. Further, because the infrared receiver 122 is arranged adjacent to any one of the infrared emitters 121, the operation of receiving and emitting the infrared lights and the realization of the sensing function of the distance sensing module 12 are ensured.

Furthermore, the infrared receiver 122 is arranged adjacent to at least two infrared emitters 121, so as to increase a positional association relationship between the infrared receiver 122 and the infrared emitters 121 and improve sensing sensitivity and accuracy of the distance sensing module 12.

As illustrated in FIG. 2 and FIG. 3, the distance sensing module 12 may include one infrared receiver 122, and the infrared emitters 121 are arranged along the circumferential direction of the infrared receiver 122. Specifically, the infrared emitters 121 may be distributed centrosymmetrically around the infrared receiver 122, so that the infrared emitters 121 are evenly distributed around the infrared receiver 122. In such a manner, an ability of the distance sensing module 12 for sensing obstacles in all directions of the electronic device 1 is strengthened, and the overall sensing effect of the distance sensing module 12 is enhanced.

Figure 4:
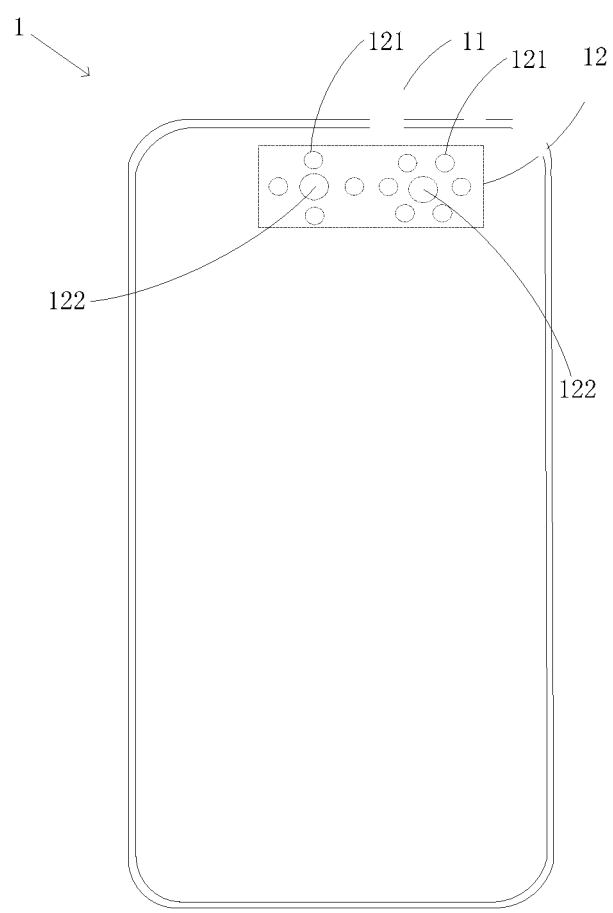
FIG. 4 is a structure diagram of an electronic device according to some exemplary embodiments.

Alternatively, as illustrated in FIG. 4, the distance sensing module 12 may further include multiple infrared receivers 122. Each the infrared receiver 122 is associated with at least one infrared emitter 121, so as to enhance, by means of the multiple infrared receivers 122, an ability of determining the position of the obstacle close to the electronic device 1, a calculating speed and a sensing efficiency of the distance sensing module 12. The number of the infrared emitters 121 associated with each infrared receiver 122 may be the same or different, and may be selected and set according to the sensitive degree of the distance sensing function, the setting position of the distance sensing module 12, and other parameters, which is not limited by the present disclosure. When multiple infrared receivers 122 are distributed on different areas of the screen module 11, the ability of the distance sensing module 12 for sensing the obstacles in all directions of the electronic device 1 can also be strengthened.

The emitted energy of the infrared emitter 121 directly influences the sensing effect of the distance sensing module 12 and the display effect of the screen module 11. The distribution of the emitted energies of multiple infrared emitters 121 is exemplarily illustrated below.

In some embodiments, the emitted energies of all of the multiple infrared emitters 121 may be the same. By means of a position relationship between the infrared emitter 121 and the infrared receiver 122 in the above embodiments, the sensing effect of the distance sensing module 12 may be adjusted, and configuration cost and debugging difficulty of the infrared emitter 121 may be reduced.

In some embodiments, it is also possible to make the emitted energies of at least two infrared emitters 121 different. Because the emitted energies at the different positions below the display area of the display module 11 are different, and after encountering an obstacle, reflected energies of the infrared lights emitted from the screen module 11 are also different, the position and distance of the obstacle can be accurately determined based on a difference between the emitted energy and the reflected energy at each position, thereby enhancing the distance sensing effect.

In addition, the electronic device 1 may further include a device body. The device body includes at least one screen assembly surface, and the display area of the screen module 11 covers the screen assembly surface to achieve a full-screen display effect. The distance sensing module 12 arranged below the display area of the screen module 11 avoids the occupation of the display area; besides, by setting multiple infrared emitters 121 each with emitted energy less than the excitation threshold of the photoelectric effect unit, the generation of light spot after the screen is off is avoided, and an appearance effect of the electronic device 1 in the off-screen state is enhanced.

Alternatively, the display area of the screen module 11 may also cover a part of area of the screen assembly surface. The distance sensing module 12 arranged below the display area of the screen module 11 may also reduce the occupation of the display area; besides, by setting multiple infrared emitters 121 each with emitted energy less than the excitation threshold of the photoelectric effect unit, the generation of light spot after the screen is off is avoided, and the appearance effect of the electronic device 1 when the screen is off is enhanced.

Furthermore, the display area of the screen module 11 includes the edge area, and the distance sensing module 12 is arranged below the edge area, so as to reduce the occupation of the central part of the display area, and avoid structural or functional interference to the screen module 11.

Figure 5:
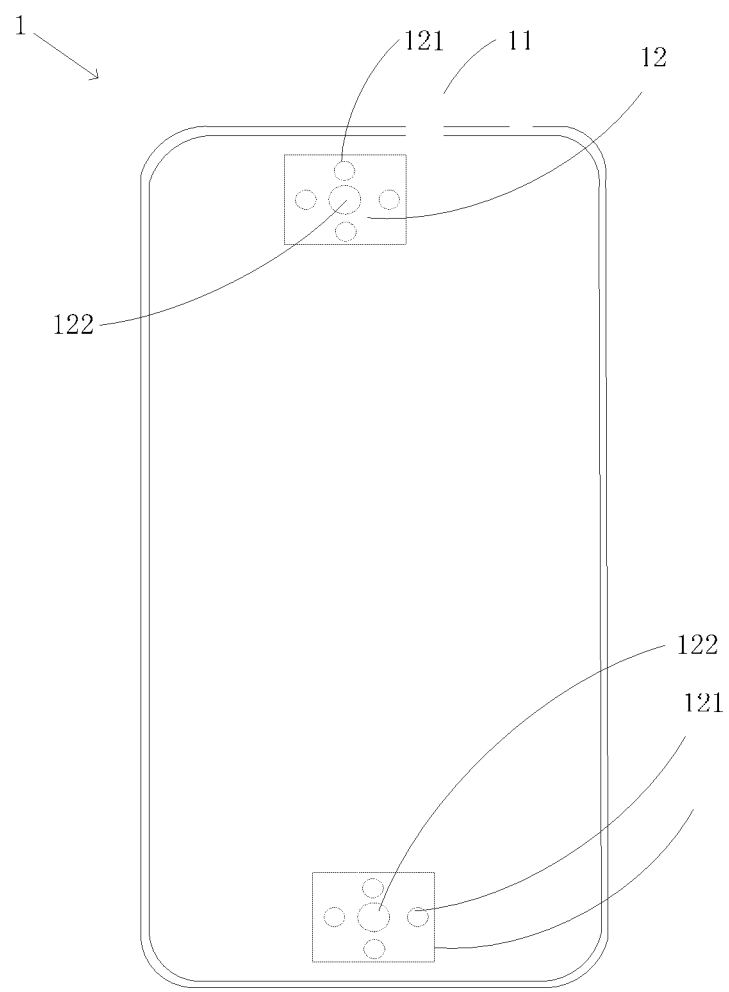
FIG. 5 is a structure diagram of an electronic device according to some exemplary embodiments.

Furthermore, the electronic device 1 may include multiple distance sensing modules 12. The multiple distance sensing modules 12 may be arranged at different positions of the display area, to improve a sensing range and sensitivity of the distance sensing module 12. As illustrated in FIG. 5, the electronic device 1 may include two distance sensing modules 12. One of the two distance sensing modules 12 is arranged on the top edge of the display area, and the other is arranged on the bottom edge of the display area, so that distances of the obstacles from the top or bottom of the electronic device 1 can be sensed.

It is to be noted that the electronic device 1 may be a mobile phone, a car-mounted terminal, a tablet PC, a medical terminal, and the like, which is not limited by the present disclosure.

By arranging the distance sensing module 12 below the display area of the screen module 11, the occupation of a non-display area is reduced, and a display ratio of the screen module 11 is increased. The infrared receiver 122 and multiple infrared emitters 121 are arranged for the distance sensing module 12, so that emitted energy of each infrared emitter 121 is less than the excitation threshold of the photoelectric effect unit of the screen module 11, and the light emitting unit 111 at a corresponding position of the screen is prevented, by means of multi-point emission, from emitting light due to the interference of the emitted energy of the infrared emitter 121. In addition, the sum of the emitted energies of multiple infrared emitters 121 is greater than the operating threshold, so that the distance sensing module 12 can realize a distance sensing function by means of a collaboration of multiple infrared emitters 121. The above structure setting increases the display ratio of the screen module 11 while preventing the distance sensing module 12 from interfering with the display effect of the screen module 11.

The screen module 11 in the disclosure can be implemented in other forms, such as, a component, an assembly, a portion, a member, or a part related to the screen of the terminal. The distance sensing module in the disclosure can be implemented by a distance sensor or a distance sensing circuit. The light emitting unit in the disclosure can be implemented by a light emitter, a light emitting device, or a light emitting circuit. The photoelectric effect unit in the disclosure can be implemented by a photoelectric effect device, a photoelectric effect apparatus, or a photoelectric device utilizing the photoelectric effect.

Other implementation solutions of the present disclosure will be apparent to those skilled in the art from consideration of the specification and practice of the technical solutions of the present disclosure. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. An electronic device, comprising:
a screen module having a light emitting unit and a control circuit that is coupled with the light emitting unit, wherein when energy received by a photoelectric effect unit of the control circuit is greater than an excitation threshold of the photoelectric effect unit, the control circuit is turned on and the light emitting unit emits light; and
a distance sensing module that is arranged below a display area of the screen module and includes an infrared receiver and a plurality of infrared emitters, wherein emitted energy of any one of the plurality of infrared emitters is less than the excitation threshold of the photoelectric effect unit and a sum of emitted energies of the plurality of infrared emitters is greater than an operating threshold of the distance sensing module.

2. The electronic device of claim 1, wherein the distance sensing module further comprises a sensing body, and both the infrared receiver and the plurality of infrared emitters are integrated on the sensing body.

3. The electronic device of claim 1, wherein the display area of the screen module comprises an edge area and the distance sensing module is arranged below the edge area.

4. The electronic device of claim 1, wherein the infrared receiver and the plurality of infrared emitters are arranged in an array, and the infrared receiver is arranged adjacent to any one of the plurality of infrared emitters.

5. The electronic device of claim 1, wherein the distance sensing module comprises one infrared receiver and the plurality of infrared emitters are arranged along a circumferential direction of the infrared receiver.

6. The electronic device of claim 5, wherein the plurality of infrared emitters are distributed centrosymmetrically around the infrared receiver.

7. The electronic device of claim 1, wherein the distance sensing module comprises a plurality of infrared receivers and each of the plurality of infrared receivers is associated with at least one infrared emitter.

8. The electronic device of claim 1, wherein emitted energies of all of the plurality of infrared emitters are equal.

9. The electronic device of claim 1, wherein emitted energies of at least two infrared emitters of the plurality of infrared emitters are different.

10. The electronic device of claim 1, further comprising a device body, wherein the device body comprises at least one screen assembly surface and the display area of the screen module covers the screen assembly surface.

11. The electronic device of claim 1, wherein the infrared receiver is arranged adjacent to at least two of the plurality of infrared emitters.

12. The electronic device of claim 7, wherein a number of infrared emitters associated with one of the plurality of infrared receivers is different from that of infrared emitters associated with others of plurality of infrared receivers.

13. The electronic device of claim 7, wherein the plurality of infrared receivers are arranged at different regions below the display area of the screen module.

14. The electronic device of claim 1, further comprising a device body, wherein the device body comprises at least one screen assembly surface and the display area of the screen module covers a part of area of the screen assembly surface.

15. The electronic device of claim 1, wherein the electronic device comprises a plurality of distance sensing modules that are arranged at different positions below the display area of the screen module.

* * * * *